Figure 1:
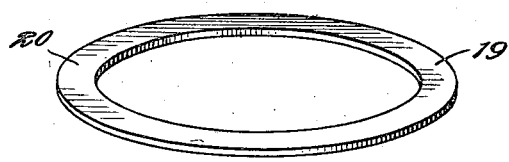

Nov. 18, 1924.                                    1,516,129
A. WIKING
GASKET GUARD
Original Filed Nov. 23, 1922

INVENTOR
August Wiking
BY
Warren S. Orton
ATTORNEY

Patented Nov. 18, 1924.

1,516,129

UNITED STATES PATENT OFFICE.

AUGUST WIKING, OF NEW YORK, N. Y., ASSIGNOR OF FORTY ONE-HUNDREDTHS TO RALPH SEDDON, OF NEW YORK, N. Y.

GASKET GUARD.

Application filed November 23, 1922, Serial No. 602,671. Renewed July 11, 1924.

*To all whom it may concern:*

Be it known that I, AUGUST WIKING, a citizen of the United States, and resident of New York city, in the county of Kings and State of New York, have invented certain new and useful Improvements in Gasket Guards, of which the following is a specification.

The invention relates in general to a closure for a glass jar, or similar open top receptacle, and the invention specifically relates to an improved form of gasket retaining device or gasket guard for use in connection with the gaskets usually found in devices of this character.

Under some conditions as where high internal pressures are formed in glass jars, such for instance, as where food stuffs are cooked in a closed jar, the internal gas pressures generated are sufficiently great to blow out the rubber gaskets usually employed in such constructions and this is permitted due to the fact that the gaskets are not restrained at their outer periphery. Gas leakage frequently develops with resulting deleterious air leakage on reversal of pressure conditions, such for instance, as when the closed jar with the cooked food therein is allowed to cool. Increasing the pressure on the parts clamping the gasket have not proven effective but on the contrary simply distorts the gasket and attenuates the thickness of the gasket material with resulting inefficiency in its sealing functions.

Accordingly, one of the primary objects of the invention is to provide a simplified form of sealing construction between the receptacle and its closure, which sealing will be effective to prevent leakage even under those conditions in which extremely high pressures are developed within the receptacle and further to attain an effective seal without necessity of using the high clamping pressures which tend to rupture glass jars.

Another object of the invention is to provide a simple form of guard for preventing distortions of a ring gasket when in use.

Another object of the invention is to provide a construction which will efficiently maintain its sealing effect, which will not be distorted by any internal pressures and which, on the contrary, will utilize any such internal pressures to more firmly secure the gasket element in place.

Still another object of the invention is to provide a construction of the type outlined which can utilize the conventional form of ring gasket thus avoiding any necessity for providing a special form of gasket particularly for this purpose and which improved construction can be utilized with jars of conventional form, with but a slight change in the construction of the old gasket seat to attain the advantages herein featured.

Various other objects and advantages of the invention will be in part obvious from an inspection of the accompanying drawings and in part will be more fully set forth in the following particular description of one form of mechanism embodying my invention, and the invention also consists in certain new and novel features of construction and combination of parts hereinafter set forth and claimed.

In the accompanying drawings:—

Figure 2:
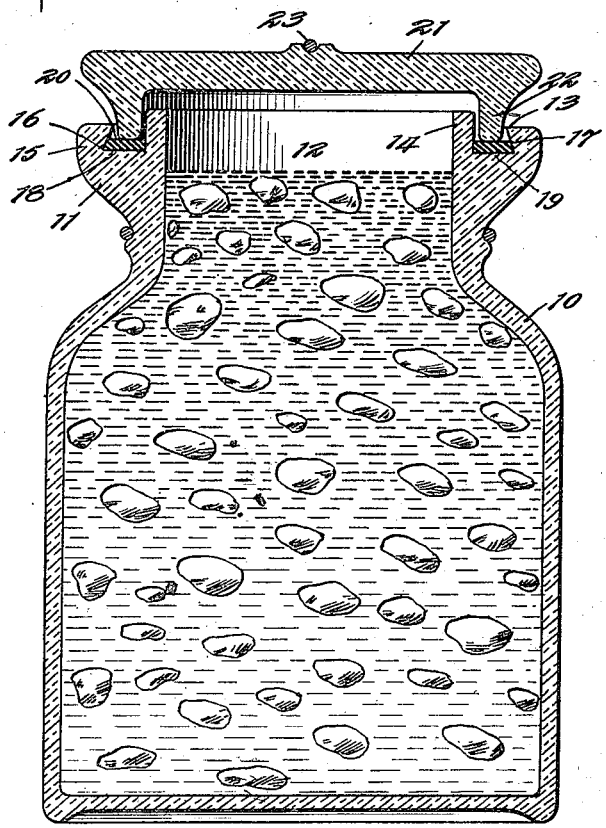

Figure 1 is a perspective view of a conventional form of ring gasket in normal configuration; and Figure 2 is a vertical sectional view taken axially through a glass jar illustrating a preferred embodiment of the invention and showing the gasket of Figure 1 in distorted position clamped between the jaw and its closure.

In the following description and in the claims, parts will be identified by specific names for convenience of expression but they are intended to be as generic in their application to similar parts as the art will permit.

In the drawing there is shown an open top receptacle 10 in the form of a glass jar of the type usually known as mason jars, and which differs from conventional forms in that the upper part 11 outlining the throat 12 is of increased thickness to provide a broad bearing support for the gasket and to provide a reinforcement to the upper part of the jar. The upper edge 13 of this part is provided with two concentrically disposed upstanding rims 14 and 15 constituting integral parts of the jar. The inner rim 14 outlines the upper portion of the throat 12 and provides a pouring rim for the jar. The outer rim 15, hereinafter referred to specifically as a gasket guard is in spaced relation to the rim 14 to form therebetween a shallow, annular gasket receiving groove 16. The upper top side of the rim 15 is disposed in a horizontal plane slightly below the upper edge of the rim 14 so that there is stepped formation between the rims, so that in pouring liquids from the jar there will be no interference from the outer depressed rim. The inner side wall 17 of the outer rim 15 is undercut so that the bottom 18 of the groove is of greater width than the top considered diametrically of the receptacle. While this undercutting assists in defeating any tendency of the outer edge of the gasket from raising the device is effective even though the wall be parallel to the inner wall of the groove.

A gasket 19, preferably of soft rubber, is fitted in the groove and is protected on all sides, except its upper exposed side 20. By this construction it will be understood that all, or substantially all, of the gasket is contained in the groove and that it is held by the rim 15 from bodily outward movement considered laterally. From the showing in Figure 1 it will be noted that the gasket is of the conventional flat ring type preferably rectangular in radial cross-section at any part of the ring. It has such an internal diameter that it substantially fits about the perimeter of the inner rim 14 and has such width that it can pass freely through the restricted width of the upper part of the groove 16.

In operation it will be understood that the jar is filled; the gasket inserted in the groove either by dropping the same through the restricted opening at the top thereof or by distorting the gasket, when formed of readily distortable material, and thus forcing the same through the restricted opening towards the bottom of the groove. The closure is positioned with the depending flange engaging the top of the gasket and by the usual holding means the closure is pressed into position as shown in Figure 2. The pressure of the closure on the gasket will tend to distort the gasket and force the outer periphery of the gasket into engagement with the undercut shoulder constituting the outlining wall of the groove, if the gasket is not already in such position due to the close interfitting of the parts.

It is a feature of this disclosure that the gasket is held by the guard ring or rim engaging its outer periphery and when once distorted by the pressure of the closure no further distortion is possible and the gasket is maintained in position as long as the closure is disposed in its operative position. Any internal pressure which may develop as by cooking the contents of the jar, will leak over the top of the inner rim 14 and bear on the inner top portion of the gasket between the rim and the depending flange of the closure. Any such pressure, however, will simply tend to more firmly seat the gasket and more firmly force the inner portion of the gasket against the depending flange of the closure. In other words, the greater the internal pressure, the greater will be the sealing of the gasket. As this internal pressure acts equally on all parts of the jar and its closure there is avoided any inequality of pressures which might otherwise tend to rupture the jar. There is also avoided any necessity of abnormal clamping pressures between the jar and its closure for it is simply required that the closure press on the gasket with the usual manually effected pressure to insure a seating action sufficient to avoid leakage.

While I have shown and described, and have pointed out in the annexed claims, certain novel features of my invention, it will be understood that various omissions, substitutions and changes in the form and details of the device illustrated and in its operation may be made by those skilled in the art without departing from the spirit of the invention.

Having thus described my invention, I claim:

1. An open top glass receptacle provided with a pair of upstanding concentric rims defining the open top of the receptacle, said rims forming an annular gasket receiving groove therebetween, the outer rim being undercut on its inner side to form the groove of greater cross-sectional width horizontally at its bottom than at its top, an annular flexible gasket fitted in said groove, positioned below the top of the undercut rim and held against lateral movement by the rims and a closure for the receptacle having a depending flange adapted to be held in pressing engagement with the exposed upper side of the gasket and acting thereon to distort the same to fit against the undercut side of the outer rim.

2. In a device of the class described, the combination of a jar provided with a gasket receiving groove, open on its upper side and otherwise closed, a distortable gasket seated in said groove and normally having its upper surface positioned below the top of a portion of the jar provided with the groove and having a cross-section less than the corresponding cross-sectional area of the groove and a closure for the jar provided with means for distorting the gasket to fill up the bottom of the groove and thus fit snugly between the walls of the groove.

3. In a device of the class described, the combination of a jar having a top provided with a groove having a greater width at its bottom than at its top considered radially, an annular distortable gasket seated in said groove below the top thereof, a closure having a circular depending flange engaging the top of said gasket in spaced relation to its inner periphery, the top of the gasket adjacent its inner periphery being exposed to the interior of the jar.

4. In a device of the class described, the combination of a jar provided with an upwardly facing gasket receiving groove, a distortable ring gasket positioned in said groove below the top thereof whereby the gasket is held from displacement from the groove by pressure conditions in the jar, said gasket normally having a configuration differing from the configuration of the part of the groove into which it is positioned and a closure for the jar provided with means for engaging the top of the gasket and acting thereon to distort the same from its normal configuration and to press the same into a tight fitting engagement with the bottom and adjacent part of the sides outlining the groove.

Signed at New York city in the county of New York and State of New York this 21st day of November, A. D. 1922.

AUGUST WIKING.

Witness:
SARA A. THORNTON.